US008090706B2

(12) United States Patent
Bharat

(10) Patent No.: US 8,090,706 B2
(45) Date of Patent: Jan. 3, 2012

(54) RENDERING ADVERTISEMENTS WITH DOCUMENTS HAVING ONE OR MORE TOPICS USING USER TOPIC INTEREST INFORMATION

(75) Inventor: Krishna Bharat, Santa Clara, CA (US)

(73) Assignee: Google, Inc., Mountain View, CA (US)

( * ) Notice: Subject to any disclaimer, the term of this patent is extended or adjusted under 35 U.S.C. 154(b) by 309 days.

(21) Appl. No.: 11/962,846

(22) Filed: Dec. 21, 2007

(65) Prior Publication Data

US 2008/0097833 A1 Apr. 24, 2008

Related U.S. Application Data

(63) Continuation of application No. 10/610,322, filed on Jun. 30, 2003, now Pat. No. 7,346,606.

(51) Int. Cl.
*G06F 17/30* (2006.01)
*G06Q 30/00* (2006.01)

(52) U.S. Cl. .................................... 707/709; 705/14.54

(58) Field of Classification Search .................. 707/3–6, 707/709, 999.003, 999.004, 999.005, 999.006; 705/14.54

See application file for complete search history.

(56) References Cited

U.S. PATENT DOCUMENTS 5,694,594 A 12/1997 Chang
5,724,521 A 3/1998 Dedrick
5,740,549 A 4/1998 Reilly et al.
5,848,397 A 12/1998 Marsh et al.
5,948,061 A 9/1999 Merriman
6,026,368 A 2/2000 Brown et al.
6,044,376 A 3/2000 Kurtzman, II
6,078,914 A 6/2000 Redfern
6,122,647 A 9/2000 Horowitz et al.
6,134,532 A 10/2000 Lazarus et al.
6,144,944 A 11/2000 Kurtzman, II et al.
6,167,382 A 12/2000 Sparks et al.
6,269,361 B1 7/2001 Davis et al.
6,401,075 B1 6/2002 Mason et al.
6,490,577 B1 12/2002 Anwar
6,577,329 B1 * 6/2003 Flickner et al. ............... 715/774
6,985,882 B1 1/2006 Del Sesto
7,039,599 B2 5/2006 Merriman
7,136,875 B2 11/2006 Anderson et al.

(Continued)

FOREIGN PATENT DOCUMENTS

JP 2001-109779 4/2001

(Continued)

OTHER PUBLICATIONS

U.S. Appl. No. 60/466,576, Provisional Application of Schmitter's Publication, Apr. 30, 2003, pp. 1-16.*

(Continued)

*Primary Examiner* — James Trujillo
*Assistant Examiner* — Jorge A Casanova
(74) *Attorney, Agent, or Firm* — John C. Pokotylo; Straub & Pokotylo

(57) ABSTRACT

Ambiguities with respect to a user topic interest may be resolved so that useful topic-relevant ads can be presented. Such ambiguities may be resolved by monitoring user behavior, determining a user topic interest (e.g., from a plurality of different candidate topics) based on the monitored behavior, and serving ads relevant to the determined user topic interest.

17 Claims, 11 Drawing Sheets

CLIENT-SIDE OPTIMIZED AD RENDERING
1200
LOAD OPTIMIZABLE DOCUMENT
1210
RENDER AN INITIAL SET OF ADS IN ASSOCIATION WITH THE DOCUMENT
1220
MONITOR USER ACTIVITY
1230
1240
TRIGGER
CLOSE
RETURN
1299
REGION/TOPIC INTEREST RELATED USER ACTIVITY OBSERVED
DETERMINE/RECORD USER REGION/TOPIC INTEREST USING, AT LEAST OBSERVED ACTIVITY
1250
ADJUST AD SCORE(S) USING, AT LEAST, USER INTEREST
1260
DETERMINE, IN ACCORDANCE WITH A POLICY, WHETHER A DIFFERENT SET OF ADS SHOULD BE RENDERED IN ASSOCIATION WITH DOCUMENT USING AT LEAST ADJUSTED AD SCORES (AND PREVIOUS AD SCORES)
1270
NO
UPDATE ADS?
YES
1280
RENDER NEW SET OF ADS IN ASSOCIATION WITH DOCUMENT
1290

U.S. PATENT DOCUMENTS

| | | | | |
|---|---|---|---|---|
| 7,243,300 | B1 | 7/2007 | Metcalfe et al. | |
| 2004/0064447 | A1 * | 4/2004 | Simske et al. | 707/5 |
| 2005/0005242 | A1 * | 1/2005 | Hoyle | 715/745 |
| 2005/0033771 | A1 * | 2/2005 | Schmitter et al. | 707/104.1 |

FOREIGN PATENT DOCUMENTS

| | | |
|---|---|---|
| JP | 2002-092023 | 3/2002 |
| WO | WO 97/21183 | 6/1997 |
| WO | WO 01/80075 | 10/2001 |

OTHER PUBLICATIONS

Chinese Office Action for Chinese Patent Application No. 200480024370.3, mailed on Nov. 23, 2007 (10 pgs.) (with English Translation (15 pgs.)).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb. 1, 1997.
Information Access Technologies, Inc., Aaddzz brochure, "The Best Way To Buy And Sell Web Advertising Space," © 1997.
Information Access Technologies, Inc., Aaddzz.com website archive from www. Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Henzinger, Monica, "Web Information Retrieval—An Algorithmic Perspective", *Lecture Notes in Computer Science*, (M. Paterson (Ed.): ESA 2000, LNCS 1879, pp. 1-8, (Springer-Verlag, Berlin, Heidelberg).
Zeff, R. et al., *Advertising on the Internet*, 2nd Ed., John Wiley & Sons, 1999.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
Communication for European Patent Application No. 04 756 460.4-1238, mailed on Mar. 27, 2009 (5 pgs.).
Notification of the Second Office Action for Chinese Patent Application No. 200480024370.3, mailed May 16, 2008 (5 pgs.) with translation (8 pgs.).
Notice of Reasons for Rejection for Japanese Patent Application No. 2006-517810, mailed Apr. 7, 2009 (6 pgs.) with translation (8 pgs.).
Rejection Decision for Chinese Patent Application No. 200480024370.3, mailed Aug. 21, 2009 (6 pgs.) with translation (6 pgs.).
Canadian Office Action for Canadian Patent Application No. 2,530,493, mailed Oct. 27, 2009 (3 pgs.).
Final Notice of Rejection for Japanese Patent Application No. 2006-517810, mailed May 11, 2010 (3 pgs.) with translation (4 pgs.).
Translation of a Notification of Reexamination for Chinese Patent Application No. 200480024370.3, mailed May 4, 2011 (5 pgs.).
European Search Report for European Patent Application No. 11002885.9-1238, mailed Jul. 6, 2011 (8 pgs.).
Translation of Decision of Rejection for Japanese Patent Application No. 2006-517810, mailed Jul. 19, 2011 (3 pgs.)
Translation of Decision of Dismissal of Amendment for Japanese Patent Application No. 2006-517810, mailed Jul. 19, 2011 (3 pgs.).
Notice of Reasons for Rejection for Japanese Patent Application No. 2009-233645, mailed Sep. 13, 2011 (4 pgs.) with translation (5 pgs.).

* cited by examiner

ADVERTISERS
110
AD ENTRY, MAINTENANCE AND DELIVERY SYSTEM(S)
120
AD CONSUMERS
130

210
AD SERVER
230
CONTENT SERVER
240
E-MAIL SERVER
NETWORK(S)
260
220
SEARCH ENGINE
200
250
USER DEVICE (CLIENT)

320
USER BEHAVIOR
USER INTEREST IN DOCUMENT REGION
TOPIC; DOCUMENT REGION
TOPIC
TOPIC-RELEVANT ADS
310

400

| REGION (610) | AD, ... (620) |
|---|---|
| | |
| . . . | . . . |
| | |

| AD (710) | AD INTEREST SCORE (720) |
|---|---|
| | |
| . . . | . . . |
| | |

| REGION (810) | TOPIC (820) |
|---|---|
| | |
| . . . | . . . |
| | |

| TOPIC (910) | INTEREST SCORE (920) |
|---|---|
| | |
| . . . | . . . |
| | |

| TOPIC (1010) | AD, ... (1020) |
|---|---|
| | |
| . . . | . . . |
| | |

RENDERING ADVERTISEMENTS WITH DOCUMENTS HAVING ONE OR MORE TOPICS USING USER TOPIC INTEREST INFORMATION

§0. RELATED APPLICATION(S)

This application is a continuation of U.S. patent application Ser. No. 10/610,322 (incorporated herein by reference), titled "RENDERING ADVERTISEMENTS WITH DOCUMENTS HAVING ONE OR MORE TOPICS USING USER TOPIC INTEREST INFORMATION," filed on Jun. 30, 2003, now U.S. Pat. No. 7,346,606 and listing Krishna Bharat as the inventor.

§1. BACKGROUND OF THE INVENTION

§1.1 Field of the Invention

The present invention concerns advertising. In particular, the present invention concerns the targeted serving and rendering of ads.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site. An advertiser will normally determine such targeting manually.

Regardless of the strategy, Web site-based ads (also referred to as "Web ads") are typically presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered with a search results page and so that they will be relevant, presumably, to the query that prompted the search results page. Although search result pages afford advertisers a great opportunity to target their ads to a more receptive audience, some queries may have alternative interpretations. For example, the query term "jaguar" could refer to the car by that name, the animal by that name, the NFL football team by that name, etc. If the user is interested in the animal, then the user might not be interested in search results which pertain to the car or NFL football team. Similarly, the user might not be interested in advertisements, targeted to the keyword "Jaguar," but that pertain to the car or NFL football team. Therefore, it would be useful to resolve ambiguities, such as those like the one described above, so that ads presented will more likely be of interest to the user.

Other targeted advertising systems, such as those that target ads based on e-mail information (See, e.g., the systems described in U.S. patent application Ser. No. 10/452,830 (incorporated herein by reference), entitled "SERVING ADVERTISEMENTS USING INFORMATION ASSOCIATED WITH E-MAIL", filed on Jun. 2, 2003 and listing Jeffrey A. Dean, Georges R. Harik and Paul Bucheit); or those that target ads based on content (See, e.g., U.S. patent application Ser. No. 10/375,900 (incorporated herein by reference), entitled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar) may have similar challenges. That is, advertising systems would like to present advertisements that are relevant to the user requested information in general, and related to the current user interest in particular.

When ads are shown in association with a document (e.g., a Web page,) it is desirable that the ads be targeted based on the topic or topics suggested by the content of the document. Often, however, the document content may suggest different topics. Consequently, the targeting of advertisements may be sub-optimal because it is not clear which of the applicable topics the user is currently interested in. In general, if a document has content concerning different topics, it may be unclear which of the topics the user is most interested in at the moment. Consequently, if topic-relevant ads are to be presented, it may be unclear which of a number of candidate topic-relevant ads would be most useful to the user. Therefore, if a document has different topics, it would be useful to determine which of the different topics the user is most interested in at the moment so that topic-relevant ads presented will more likely be of interest to the user.

§2. SUMMARY OF THE INVENTION

The present invention helps resolve ambiguities with respect to a user topic interest so that useful topic-relevant ads can be presented. The present invention may do so by tracking user behavior, determining a user topic interest (e.g., from a plurality of different candidate topics) based on the monitored behavior, and serving ads relevant to the determined user topic interest.

§3. BRIEF DESCRIPTION OF THE DRAWINGS

FIGS. 6-10 are exemplary data structures that may be generated and/or used in a manner consistent with the present invention.

§4. DETAILED DESCRIPTION

The present invention may involve novel methods, apparatus, message formats and/or data structures for resolving ambiguities with respect to a user topic interest so that useful topic-relevant ads can be presented. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Examples of operations are provided in §4.3. Finally, some conclusions regarding the present invention are set forth in §4.4.

§4.1 ENVIRONMENTS IN WHICH, OR WITH WHICH, THE PRESENT INVENTION MAY OPERATE

§4.1.1 Exemplary Advertising Environment

Figure 1:
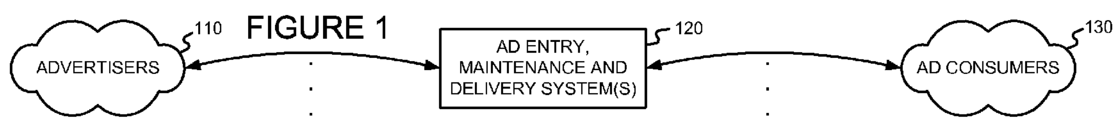
FIG. 1 is a high-level diagram showing parties or entities that can interact with an advertising system.

FIG. 1 is a high level diagram of an advertising environment. The environment may include an ad entry, maintenance and delivery system (simply referred to an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
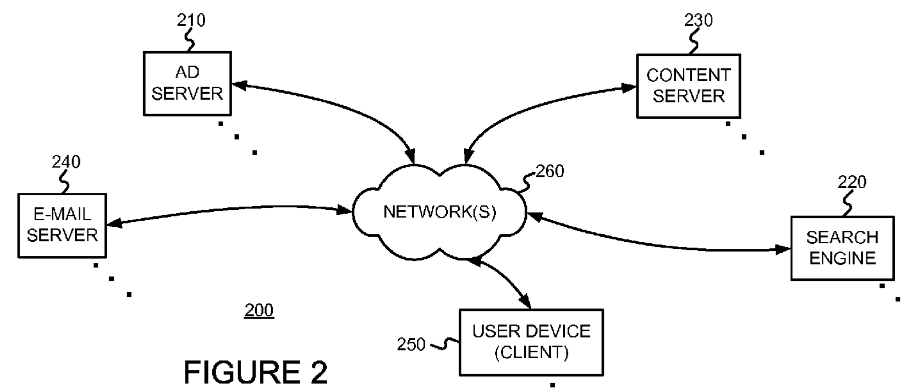
FIG. 2 illustrates an environment in which advertisers can target their ads on search results pages generated by a search engine, documents served by content servers, and/or e-mail.

The ad server 120 may be similar to the one described in FIG. 2 of U.S. patent application Ser. No. 10/375,900, mentioned in §1.2 above. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include targeting information (e.g., a set of keywords, a set of one or more topics, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft or the Navigator browser from AOL/Time Warner), an e-mail facility (e.g., Outlook from Microsoft), etc. A search engine 220 may permit user devices 250 to search collections of documents (e.g., Web pages). A content server 210 may permit user devices 250 to access documents. An e-mail server (e.g., Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220, content provided by the content server 230, and/or e-mail supported by the e-mail server 240 and/or user device e-mail facilities.

Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. Alternatively, or in addition, such information may be provided back to the ad server 120/210 by some other means.

As discussed in U.S. patent application Ser. No. 10/375,900 (introduced in §1.2 above), ads targeted to documents served by content servers may also be served.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

§4.1.2 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases, though, as alluded to above, the present invention obviates the need for an advertiser to enter targeting keywords. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information, such as that described in U.S. patent application Ser. No. 10/452,791, entitled "SERVING ADVERTISEMENTS USING USER REQUEST INFORMATION AND USER INFORMATION," filed on the Jun. 2, 2003, and listing Steve Lawrence, Mehran Sahami and Amit Singhal as inventors. This application is incorporated herein by reference.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 EXEMPLARY EMBODIMENTS

Figure 3:
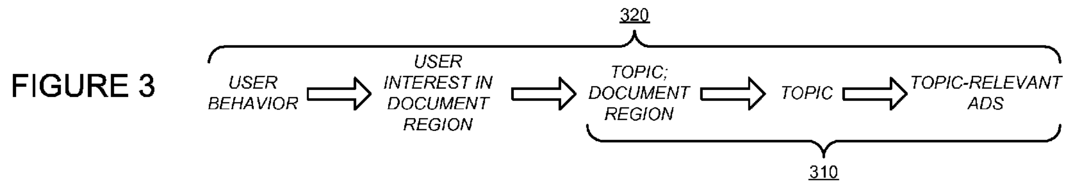
FIG. 3 illustrates information that may be used and associated in a manner consistent with the present invention.

As shown in FIG. 3, the present invention teaches two features—document region (or topic) to ad(s) association 310, and topic-relevant ad optimization 320 using such associations 310. The first feature is described below with reference to FIGS. 4 and 6, while the second feature is described below with reference to FIGS. 5 and 7. Still referring to FIG. 3, for each of one or more document regions, one or more topics are determined. For each of the one or more topics, a set one or more topic-relevant ads are determined. These associations between document regions, topics and ads 310 may be predetermined if the document content is relatively static. As indicated by 320, at the user device (client), user behavior is monitored and user interest in a document region (and therefore a topic) is determined using such user behavior. These associations between user interests and topics may be determined in real time. Scores of topic-relevant ads may be adjusted using determined user topic interest.

As used in this description, the term "document region" is to be broadly construed as a part of a document. For example, a document region may include a spatial portion (e.g., a box, a column, an image, etc.), a section of a Web page, a temporal (e.g., audio and/or video) segment, a link, etc. The term "topic" is to be broadly construed as a concept, subject, or theme. The term "user behavior" is to include any observable or measurable user interaction with a document. Examples of user behavior include (a) cursor positioning, (b) cursor dwell time, (c) document item (e.g., link, control button, etc.) selection, (d) user eye direction relative to the document, (e) user facial expressions, (f) user expressions, and/or (g) express user input (e.g., increasing the volume of an audio segment), etc. User behavior could be used to infer topic interest or disinterest. For example, if an action was immediately reversed, then it may be interpreted as evidence of disinterest. Suppose, for example, the user clicked on a hyperlink, visited a Web page and immediately returned. This sequence of user actions might imply that the user was not interested in a topic or topics included in the Web page. As another example, if an ad made available to the user was not selected while it was being rendered for a certain duration, this might imply that the user was not interested in a topic or topics associated with the ad.

Figure 4:
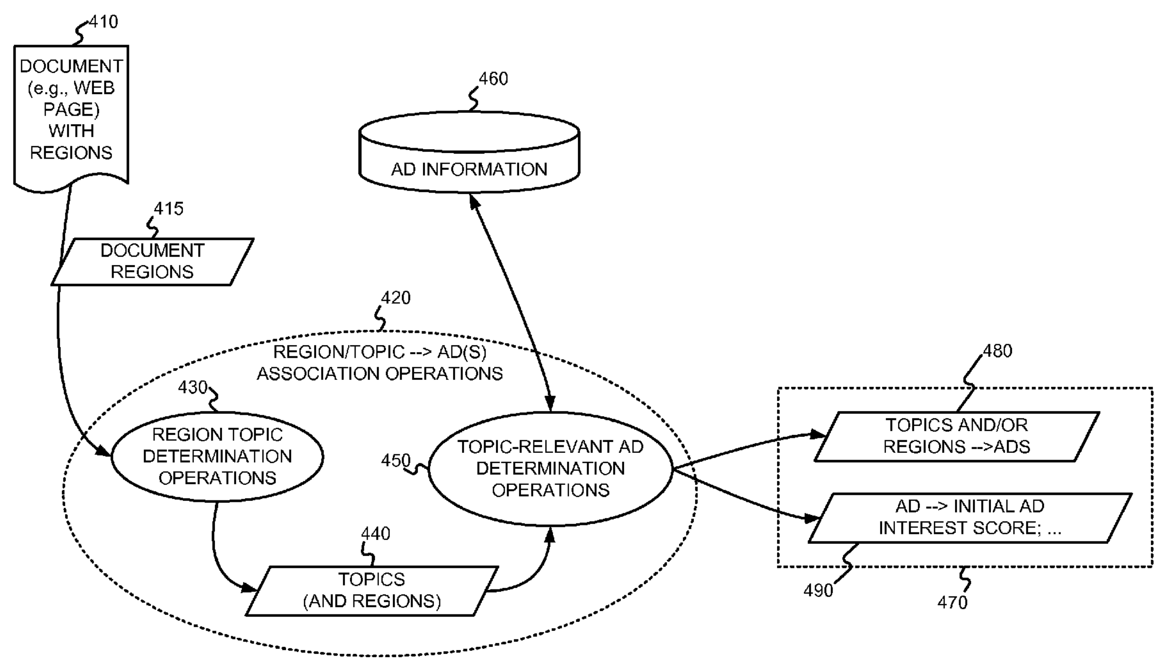
FIG. 4 is a bubble diagram of operations that may be performed, and information that may be generated, used, and/or stored, to generate document region and/or topic to ad(s) associations in a manner consistent with the present invention.

FIG. 4 is a bubble diagram of operations that may be performed, and information that may be generated, used, and/or stored, to generate document region and/or topic to ad(s) associations in a manner consistent with the present invention. Region/topic to ad(s) association operations 420 may include region topic determination operations 430 and topic-relevant ad determination operations 450. A document (e.g., a Web page) 410 may have more than one region, and different regions may concern different topics. The document 410 itself, or the regions of the document 415, may be provided to the region topic determination operations 430. The region topic determination operations determine at least one topic of each of one or more regions 440. Various ways of determining topics from content are known. See, for example, U.S. Provisional Patent Application Ser. No. 60/413,536 (incorporated herein by reference), entitled "METHODS AND APPARATUS FOR SERVING RELEVANT ADVERTISEMENTS", filed on Sep. 24, 2002, and listing Jeffrey A. Dean, Georges R. Harik and Paul Bucheit as inventors; U.S. patent application Ser. No. 10/314,427 (incorporated herein by reference), entitled "METHODS AND APPARATUS FOR SERVING RELEVANT ADVERTISEMENTS", filed on Dec. 6, 2002 and listing Jeffrey A. Dean, Georges R. Harik and Paul Bucheit as inventors; and U.S. patent application Ser. No. 10/375,900 (incorporated herein by reference), entitled "SERVING ADVERTISEMENTS BASED ON CONTENT", filed on Feb. 26, 2003, listing Darrell Anderson, Paul Bucheit, Alex Carobus, Claire Cui, Jeffrey A. Dean, Georges R. Harik, Deepak Jindal, and Narayanan Shivakumar as inventors. This determined information 440 is then provided to topic-relevant ad determination operations 450 which use it 440, along with ad information 460 (which may include topic targeting), to determine, as an output 470, (i) a mapping of each of a number of topics and/or regions to one or more ads 480, and (ii) a mapping of each of one or more ads to an ad interest score 490. Exemplary region and/or topic to ad association operations 420 are described in §4.2.1 below.

Figure 5:
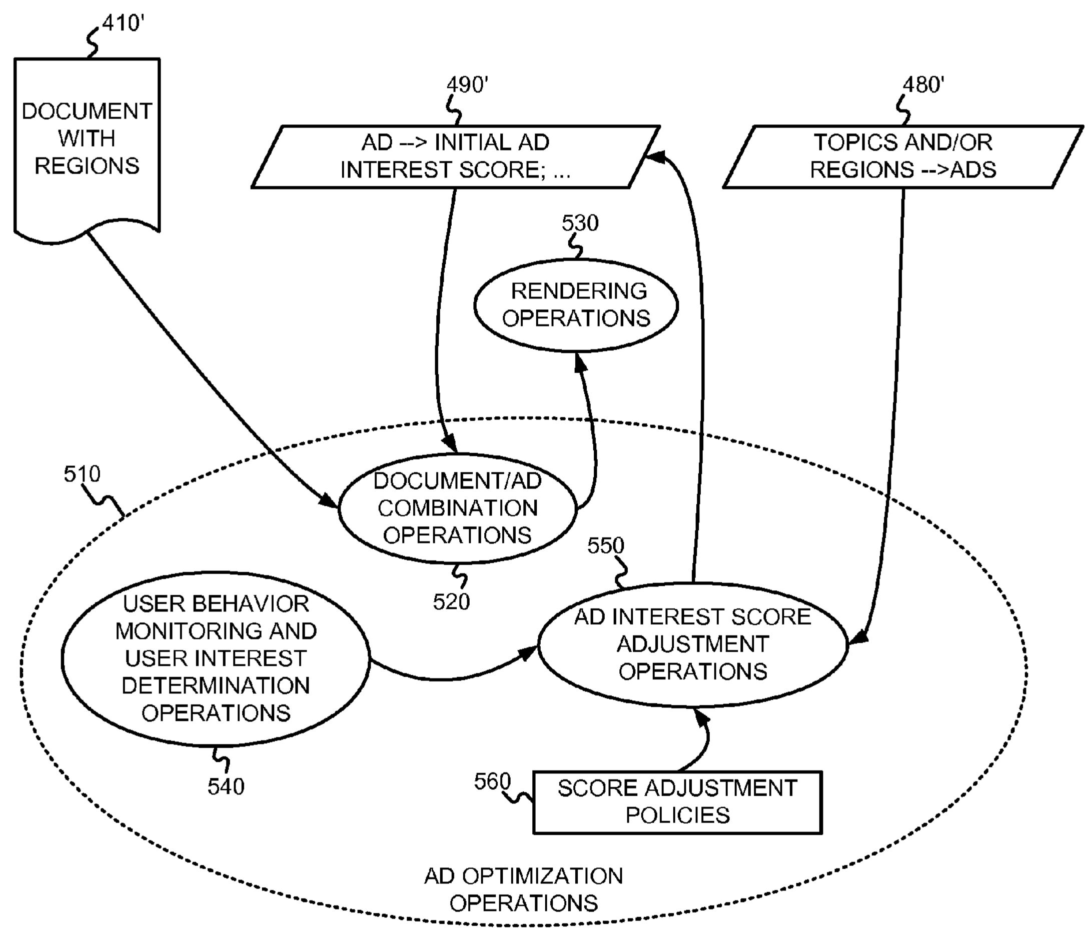
FIG. 5 is a bubble diagram of ad optimization operations that may be performed, and information that may be generated, used, and/or stored, in a manner consistent with the present invention.

FIG. 5 is a bubble diagram of (e.g., client-side) ad optimization operations that may be performed, and information that may be generated, used, and/or stored, in a manner consistent with the present invention. Ad optimization operations 510 may include document (e.g., Web page) and ad combination operations 520, user behavior monitoring and user interest determination operations 540, ad interest score adjustment operations 550 and score adjustment policies 560. Basically, the document/ad combination operations 520 may select at least one of the ads 490', using at least their respective ad interest scores, and provide the selected ad(s), along with the document (e.g., Web page) 410' to rendering operations 530 for presentation to the user.

Initially, the document 410' may be rendered in association with an initial set of one or more ads (e.g., before attempting to resolve any ambiguities in the user's present interest). However, as stated above, the present invention may be used to resolve ambiguities to determine a user's present topic interest, such that ads relevant to the user's present topic interest may be served. In this regard, user behavior monitoring and user interest determination operations 540 may be used to (i) monitor user behavior (e.g., with respect to the document 410'), and (ii) to determine the user's present interest (e.g., to resolve ambiguities about which of a number of different topics the user is presently interested in) using at least the observed user behavior. The ad interest score adjustment operations 550 may use such determinations about the user's present topic interest to adjust ad interest scores of one or more ads 490', in accordance with policies 560. Since, as described above, the document/ad combination operations 520 may use such scores 490' in determining which ads to serve with the document 410', adjusting the ad interest scores 490' may lead to changes in the ads presented in association with the document 410'. In this way, as user topic interests are discerned using their behavior, ads more relevant to a user's present topic interest may be presented to the user.

Figures 6, 7, 8, 9, 10:
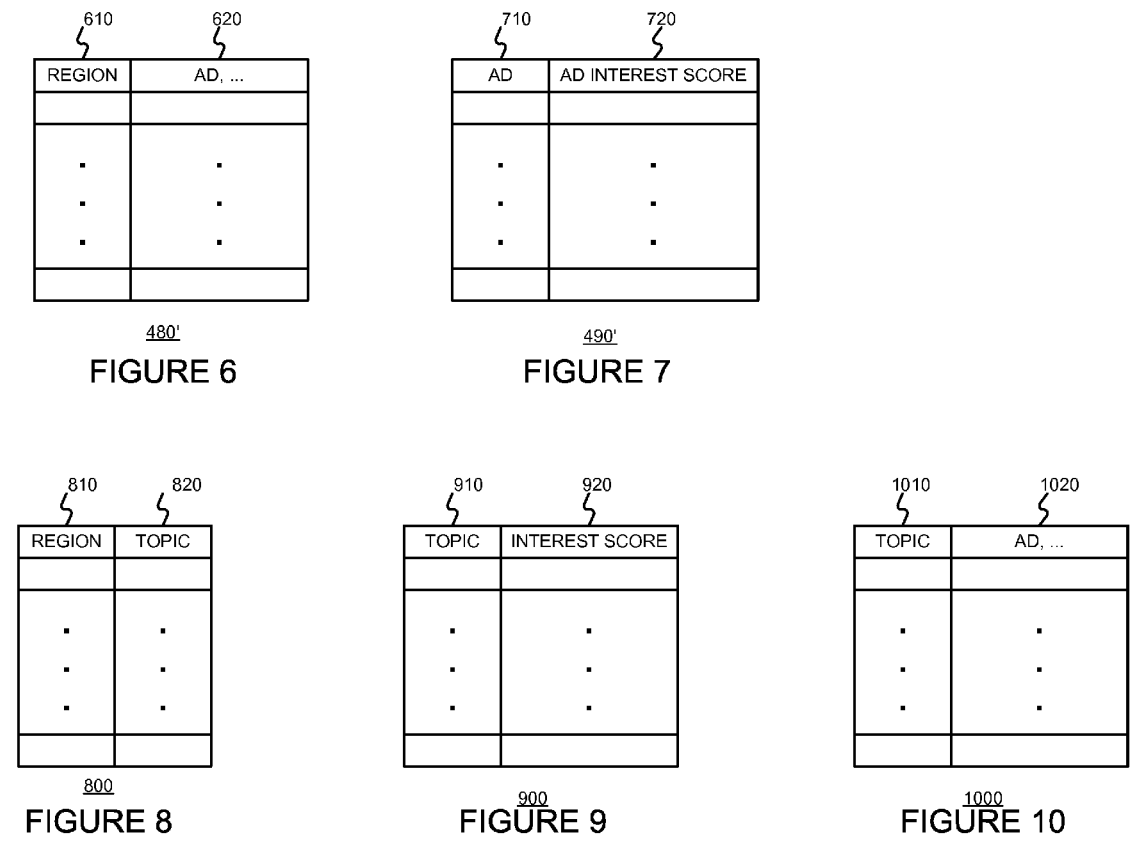

FIGS. 6-10 are exemplary data structures that may be used in a manner consistent with the present invention. For example, referring back to FIG. 4, an association or mapping of document topics and/or document regions to ads 480 may be generated. FIG. 6 is an exemplary table data structure 480' which includes entries, each entry including a document region identifier 610 and one or more associated ads 620. Referring back to FIG. 4, an association or mapping of ads to ad interest scores 490 may be generated. FIG. 7 is an exemplary table data structure 490' which includes entries, each entry including an ad (or ad identifier) 710 and an associated ad interest score 720.

FIGS. 8-10 illustrate alternative data structures to those of FIGS. 6 and 7. Instead of providing a region-ad table 480' in which a mapping between regions of the document (e.g., Web page) and one or more ads is maintained, a region-topic table 800 shown in FIG. 8, which stores mappings between document regions 810 and topics 820, is provided. Correspondingly, as shown in FIG. 9, a topic-interest score table 900, which stores mappings between topics 910 and interest scores 920, is maintained. As shown in FIG. 10, a further table 1000 stores mappings between topics 1010 and one or more ads 1020 (e.g., on a per-document basis). A database "join" allows an ad-interest score table (such as the one 490' illustrated in FIG. 7) to be recovered from the topic-interest score table 900 and the topic-ads table 1000 whenever it is needed. Since the topic-interest score table 900 is more general than the ad-interest score table 490', it can be used, advantageously, with many documents. Thus, interest scores gathered for one document (e.g., one search results Web page) can be used to show topic-relevant ads on a subsequent document, thereby increasing the scope and usefulness of the present invention.

Figure 11:
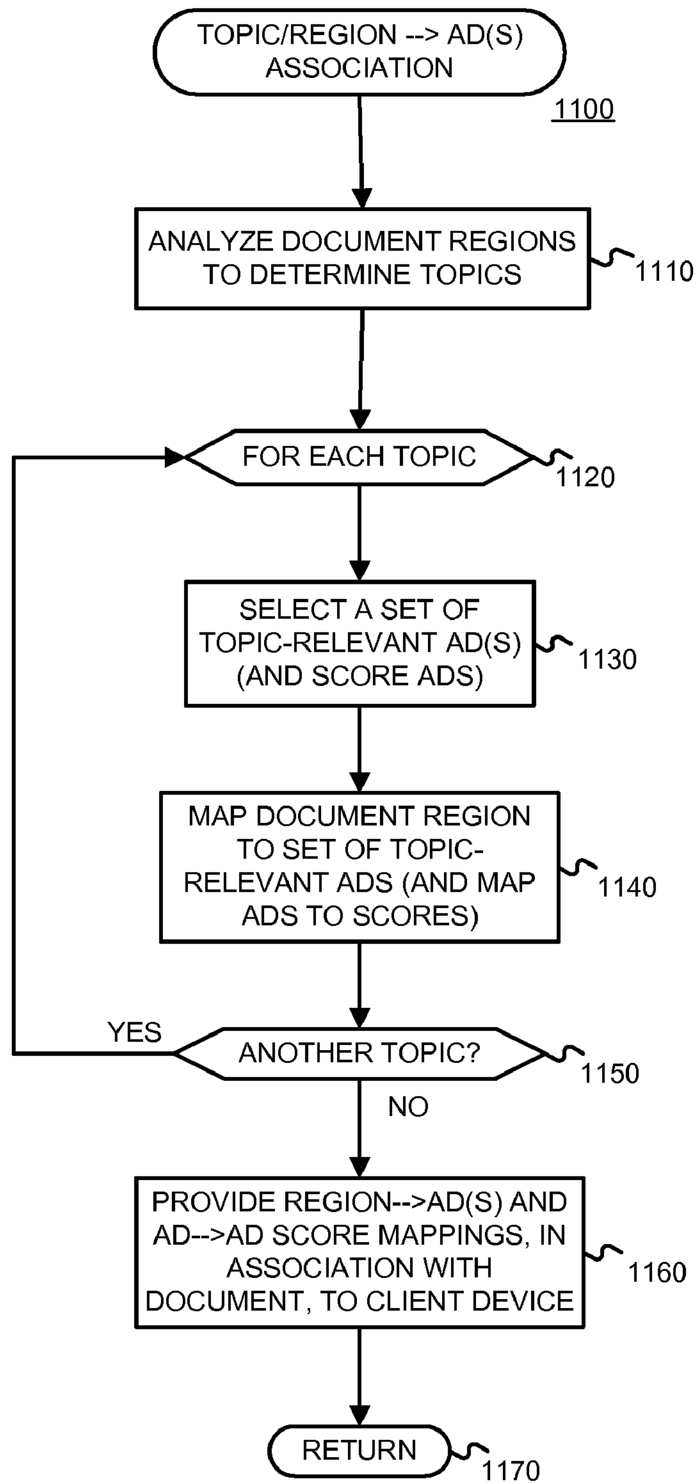
FIG. 11 is a flow diagram of an exemplary method that may be used to associate document regions and/or topics with one or more ads, in a manner consistent with the present invention.

FIG. 11 is a flow diagram of an exemplary method 1100 that may be used to associate document topics/regions with one or more ads, in a manner consistent with the present invention. This method 1100 may be performed by an ad server for example. The document (e.g., Web page) regions are analyzed to determine topics. (Step 1110) Different regions of the document may be defined by links, section tags, etc., for example. Document regions/topics can be defined using known "topic detection" techniques, such as statistical text analysis. (See, e.g., Doug Beeferman, Adam Berger, John Lafferty, "Statistical Models for Text Segmentation", at http://www.cs.cmu.edu/~aberger/pdf/ml.pdf, and Jay M Ponte and W. Bruce Croft, "Text Segmentation by Topic," at http://ciir.cs.umass.edu/pubfiles/ir-103.pdf, both incorporated herein by reference.) If the document region is a document section, content of the section may be analyzed to determine a topic. If the document region is a link, the document linked to may be analyzed to determine a topic. If document regions and/or region topics have already been determined, such predetermined information may simply be accepted. Then, for each determined topic, one or more acts are performed. (Loop 1120-1150) For example, for each topic, a set of topic-relevant ads is selected (Block 1130) and document regions are mapped to the sets of topic relevant ads (Block 1140). Finally, region to ad(s) mappings and ad to ad score mappings are provided, in association with the document, to the client device that requested the document (Block 1160) before the method 1100 is left (Node 1170). These mappings, together with the document, may be referred to as an "optimizable document."

Figure 12:
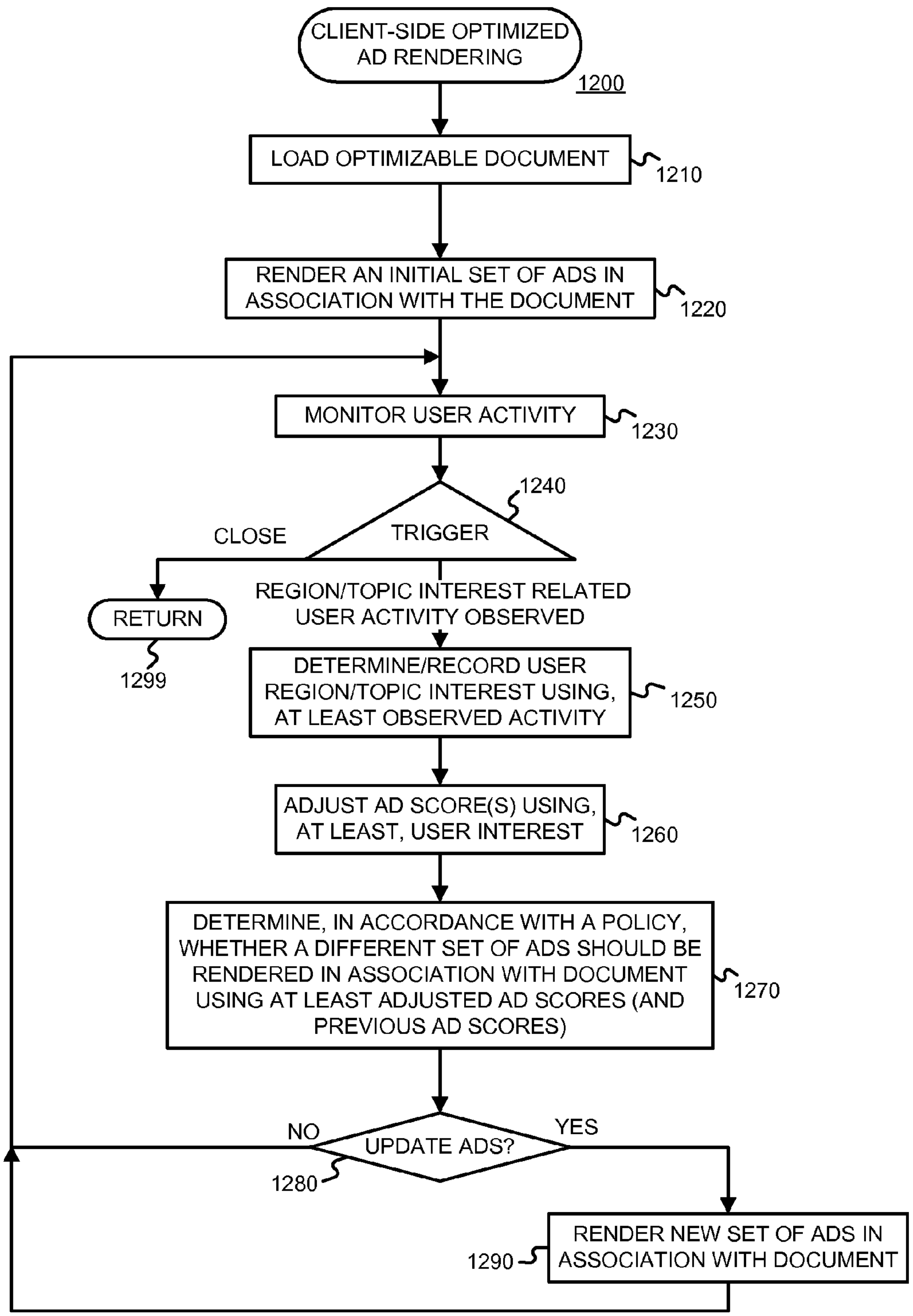
FIG. 12 is a flow diagram of an exemplary method that may be used to perform optimized client-side ad rendering, in a manner consistent with the present invention.

FIG. 12 is a flow diagram of an exemplary method 1200 that may be used to perform optimized client-side ad rendering, in a manner consistent with the present invention. This method 1200 may be performed by a client device that requested the document (e.g., a Web page such as a search result page for example). An optimizable document is loaded. (Block 1210) An initial set of ads may then be rendered in association with the document. (Block 1220) The initial set of ads may be determined using, at least, their interest scores for example. User activity is monitored. (Block 1230) Other information such as ad performance information, price information, and/or advertiser information may be used in this determination. Generally, user activity that may be used to determine a user interest is monitored. For example, activity in a particular region of a document may be used to infer user topic interest and/or a user selection may be used to express a user topic interest in the topic associated with that region.

Certain user activities may be events that trigger further processing. (Block 1240) For example, if the user activity indicates a "close" event, the method 1200 may be left. (Node 1299) If the user activity is related to user interest in a certain topic, user topic interest may be determined and/or recorded. (Block 1250) Then, the score(s) of the ad(s) associated with the topic may be adjusted using, at least, the determined user topic interest. (Block 1260) Then, whether or not a different set of ads should be rendered in association with the document using at least the adjusted score(s) of the ad(s) (and possibly previous ad scores) may be determined in accordance with a policy. (1270). If it was determined to update the ads (Decision block 1280), a new set of one or more ads is rendered in association with the document (Block 1290) and user activity monitoring is continued (Block 1230). If, on the other hand, it was not determined to update the ads (Decision block 1280), user activity monitoring is continued (Block 1230).

§4.2.1 Exemplary Techniques for Associating a Region with a Set of One or More Topic Relevant Ads Recall from block 1110 of FIG. 11 that document regions are analyzed to determine a related topic. Topics may be determined from documents by analyzing their content. For example, U.S. Provisional Patent Application Ser. No. 60/413,536 and U.S. patent application Ser. Nos. 10/314,427 and 10/375,900, as mentioned in §4.2, described ways to determine one or more topics.

Document regions can be accepted. Alternatively, or in addition, the present invention may be used to determine document regions. For example, meta data and/or structured data can define different document sections (or regions), each having different content. The different content of different sections may concern different topics, the different topics being associated with different sets of one or more ads. Accordingly, if user interest in a particular section of the document is inferred (e.g., by the user hovering a pointer cursor over the section, centering the section on a display, highlighting the section, etc.), interest scores for ads of the set of one or more ads associated with the topic of the particular section may be increased. A link such as a hyper-text link may define a region. The linked document may concern a topic being associated with a set of one or more ads. Accordingly, if user interest in the link is inferred (e.g., by the user selecting it), interest scores of the set of one or more ads associated with the topic of the linked document may be increased.

In the context of Web pages, the HTML of the Web page being transferred may be modified so that user activity with respect to the Web page can be monitored. In one implementation of the present invention, this is done by providing javascript code in the Web page that is provided to the user device (client). In this way, various user activities can be monitored and user interests can be determined using at least the monitored activities. For example, if a pointer enters a certain HTML region then it may be inferred that the user is interested in the contents of the region.

§4.2.2 Exemplary Techniques for Client-Side Ad Optimization

Recall from blocks 1230, 1240 and 1250 of FIG. 12 that user activity is monitored and user interest is determined and/or recorded using at least the monitored activity.

Recall from block 1260 that score(s) of one or more ads may be adjusted using at least the user interest. For example, if the region-ad table has an association between the region and an ad, then the ad-interest of the ad is adjusted. An ad interest score may be adjusted by various amounts corresponding to various degrees of user interest (e.g., from casual interest to intense interest) and various confidence levels associated with user interest (e.g., from inferred interest to express interest). For example, if a cursor hovers over a given region concerning a given topic (casual interest inferred), ad interest scores of one or more ads associated with this topic may be incremented by a first amount (e.g., 1 unit). If the user selects a link to a document concerning a topic (express interest), ad interest scores of one or more ads associated with the topic may be incremented by a second amount (e.g., units). If the pointer cursor stays within a given region for a considerable length of time (interest inferred), then the interest scores of corresponding ads may be incremented again (e.g., by 3 units). If a section of text is blocked and "copied" (strong express interest), then the interest scores of corresponding ads may be incremented (e.g., by 10 units).

Recall from blocks 1270, 1280 and 1290 that a new set of ads may be rendered (or the same or different ads may be rendered with different enhanced features and/or in a different order) in association with the document using the adjusted ad scores and a policy. In one example, the policy may be that if the ad-interest scores of the ads deviate significantly from the predicted interest scores of the ads, then the rendering of the ads is changed to reflect the user's interest. For example, an old ad may be replaced with a new one.

§4.2.3 Refinements and Alternatives

A number of alternatives exist for monitoring user activity and changing the rendering of ads. For example, software on the client device or an extension to the browser can record activity and change a display through the supported programming interface. In the one implementation of the present invention, the monitoring of usage and redrawing of the ads is done by Javascript in the client HTML inserted specifically for ad optimization before the Web page was sent to the client device. In one implementation of the present invention, the ad-interest scores known to the Javascript code are additionally saved in a cookie which is a persistent means of storage on the client computer. This allows the (e.g., ad and/or topic) interest scores to be recovered after a user browses over a hyperlink to a target document and returns to the original page.

In a variant of the above scheme, the region-ad table, which stores a mapping between regions of the document and ads is replaced with a region-topic table which stores a mapping between regions of the Web page and topics. Correspondingly a topic-interest table of scores is maintained. A second table records the mapping between topics and ads (e.g., on a per-page basis). A database join allows the ad-interest table to be recovered from these ad-topic and topic-interest tables whenever it is needed. The advantage of this scheme is that the topic-interest table is more general than the ad-interest table and can apply to many documents. Thus, interest scores gathered on one document (e.g., one search results page) can be used to show ads on a subsequent document where ads for the same topics exist. This increases the scope and usefulness of the present invention. Generally, any technique that determines topic-relevant ads to render or enhance using user topic interest (which may be determined using user behavior) may be used.

In another variant all user behavior tracking and ad insertion can be done by software residing on the client device (e.g., the Google Toolbar).

Ad scores may be used instead of ad interest scores. Such scores may reflect a user topic interest, but may also reflect one of more of (a) ad price information, (b) ad performance information, (c) targeting criteria match information, and (d) advertiser quality information.

Although the foregoing exemplary embodiments described a topic that a user has a present interest in, the present invention is also applicable to subtopics. For example, recall that the term "jaguar" can have three interpretations—automobile, animal, an football team—and that a set of ads can be associated with each corresponding topic. Alternatively, or in addition, there can be subtopics of the same topic that are worth distinguishing for the purpose of targeting ads. For example, for the topic "flowers" there can be the subtopics "buying flowers," "growing flowers" and "arranging flowers." There can be different sets of one or more ads associated with one or more of these subtopics.

Further, a given topic might be divided based on degrees of expertise or sophistication. For example, a user interested in the topic "volcano" could be interested in a basic introduction to volcanoes (a novice), a technical understanding of volcanoes (an expert), or be interested in a tourism information regarding volcanoes (some sophistication). Different sets of one or more ads can be associated with the different levels of user expertise in a give topic. Using evidence of sophistication determined using user actions for example, ads targeted for novices, average sophistication, or experts (e.g., children, tourists, scientists) may be served and rendered.

§4.2.4 Exemplary Apparatus

Figure 13:
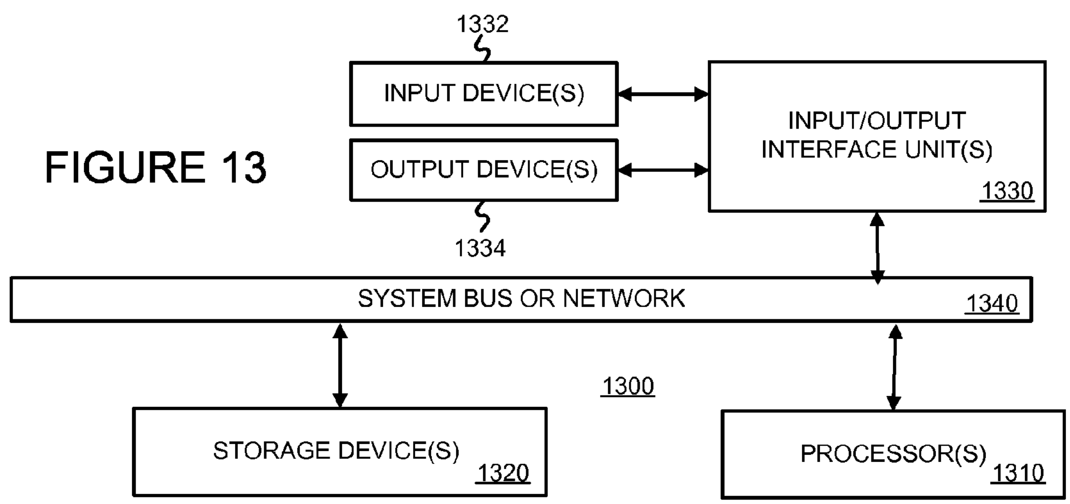
FIG. 13 is a high-level block diagram of apparatus that may be used to perform at least some of the various operations that may be used and store at least some of the information that may be used and/or generated in a manner consistent with the present invention.

FIG. 13 is high-level block diagram of a machine 1300 that may effect one or more of the operations discussed above. The machine 1300 basically includes one or more processors 1310, one or more input/output interface units 1330, one or more storage devices 1320, and one or more system buses and/or networks 1340 for facilitating the communication of information among the coupled elements. One or more input devices 1332 and one or more output devices 1334 may be coupled with the one or more input/output interfaces 1330.

The one or more processors 1310 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1320 and/or may be received from an external source via one or more input interface units 1330.

In one embodiment, the machine 1300 may be one or more conventional personal computers. In this case, the processing units 1310 may be one or more microprocessors. The bus 1340 may include a system bus. The storage devices 1320 may include system memory, such as read only memory (ROM) and/or random access memory (RAM). The storage devices 1320 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1332, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1310 through an appropriate interface 1330 coupled to the system bus 1340. The output devices 1334 may include a monitor or other type of display device, which may also be connected to the system bus 1340 via an appropriate interface. In addition to (or instead of) the monitor, the personal computer may include other (peripheral) output devices (not shown), such as speakers and printers for example.

Operations of an ad server 210, such as the region/topic to ad(s) association operations 410 and/or user device (client) operations such as the ad optimization and operations 510 may be performed by, and the various information may be stored on, one or more machines 1300. The user device (client) 250, search engine 220, content server 230, and/or e-mail server 240 may also be one or more machines 1300.

§4.3 EXAMPLES OF OPERATIONS

Figure 14:
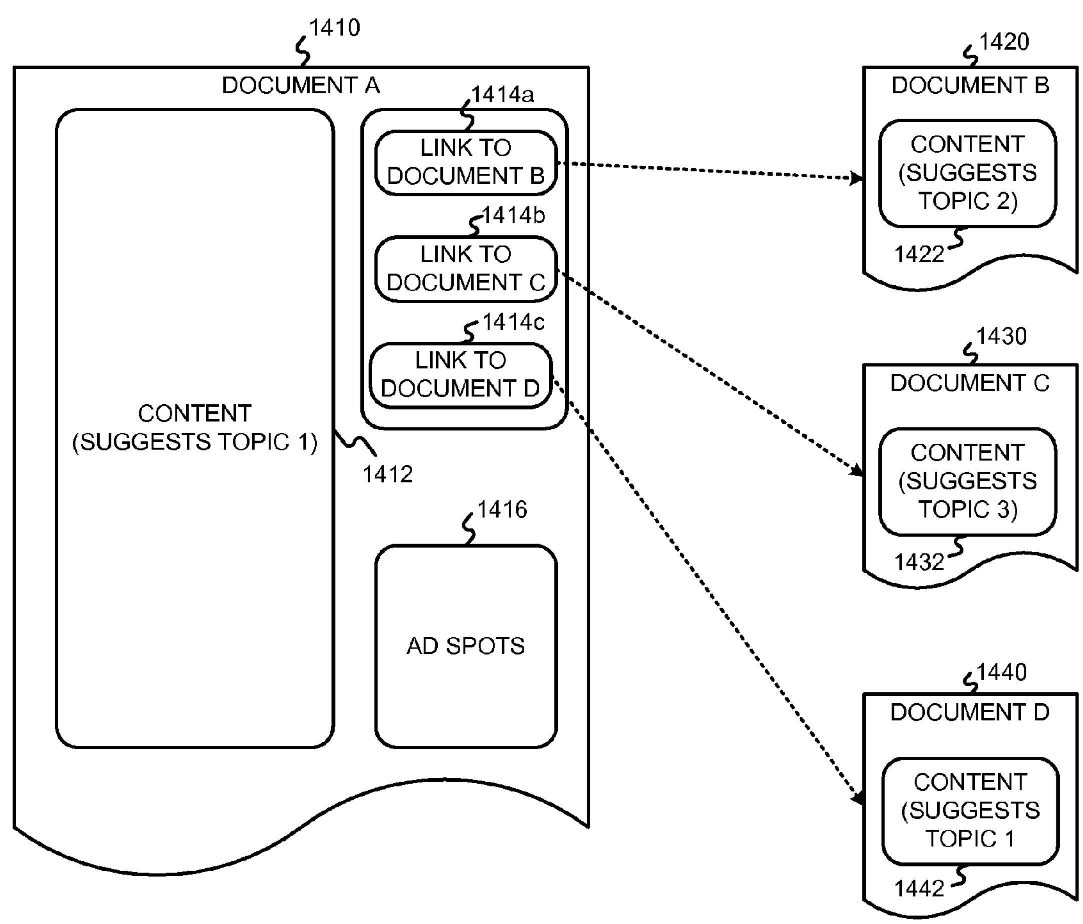
FIGS. 14-17 are diagrams illustrating examples of operations of exemplary embodiments of the present invention.

FIG. 14 illustrates a document region to topic mapping for documents such as Web pages in general. In this example 1400, a document 1410 is a Web page including content 1412, links 1414 to other documents 1420, 1430, 1440 and one or more ad spots 1416. The content 1412 may suggest a first topic (topic 1). Linked document B 1420 may include content 1422 that suggests another topic (topic 2). Similarly, linked document C 1430 may include content 1432 that suggests yet another topic (topic 3). Finally, linked document D 1440 may include content 1442 that suggests the first topic (topic 1).

In this example, one or more ads associated with topic 1 might originally be rendered in association with the document 1410. If a user were to follow the link 1414*a*, interest scores of one or more ads associated with topic 2 could be increased. In this case, upon returning back to document A 1410 from document B 1420, one or more ads associated with topic 2 might now be rendered in association with the document 1410. Similarly, if a user were to follow the link 1414*b*, interest scores of one or more ads associated with topic 3 could be increased. In this case, upon returning back to document A 1410 from document C 1430, one or more ads associated with topic 3 might now be rendered in association with the document 1410. Finally, if a user were to follow the link 1414*c*, interest scores of the one or more ads already associated with topic 1 could be increased, further increasing an interest score differential between theses ad(s) and ad(s) associated with other topics.

Figure 15:
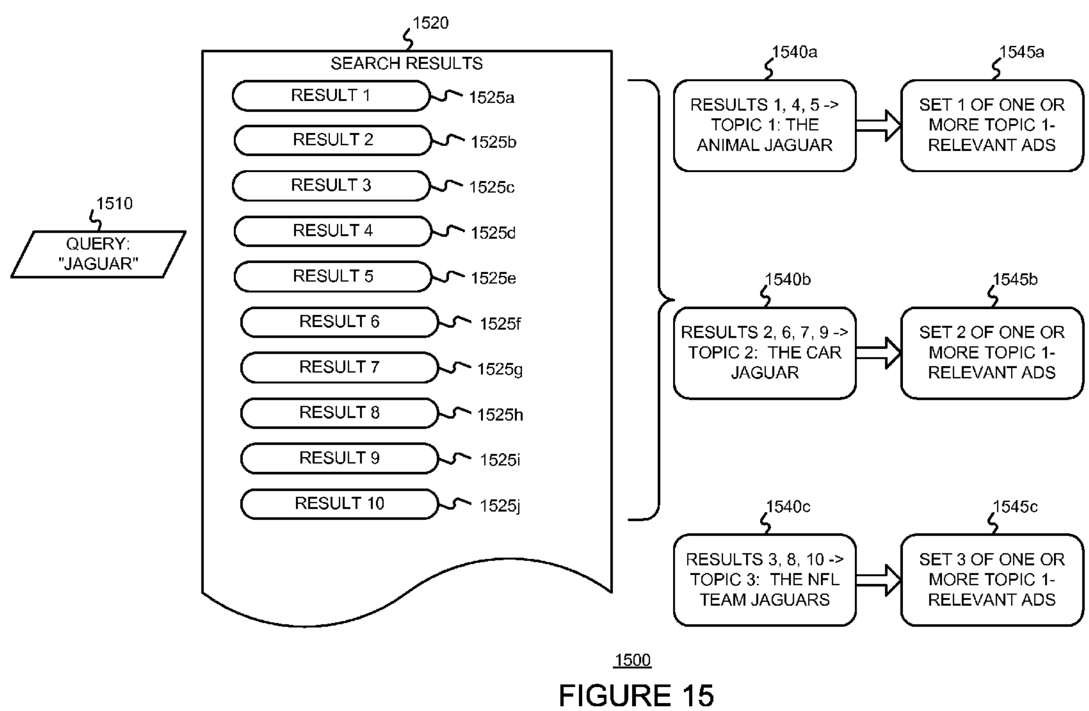

FIG. 15 illustrates a document 1520 including search results 1525 returned in response to the search query "jaguar" 1510. In this example, the search results 1525 include links to documents relevant to the query 1510. These linked documents can be analyzed, in real-time or in advance, to determine a topic. As shown, search results 1 1525*a*, 4 1525*d* and 5 1525*e* are linked to documents concerning the animal jaguar. This first topic 1540*a* is associated with a first set of one or more ads 1545*a* relevant to the first topic. Search results 2 1525*b*, 6 1525*f*, 7 1525*g* and 9 1525*i* are linked to documents concerning the car jaguar. This second topic 1540*b* is associated with a set of one or more ads 1545*b* relevant to the second topic. Finally, search results 3 1525*c*, 8 1525*h* and 10 1525*j* are linked to documents concerning the NFL team, the jaguars. This third topic 1540*c* is associated with a set of one or more ads 1545*c* relevant to the third topic. Recall from FIG. 6 that a table that maps regions (e.g., content sections within a table, or specific hyperlinks, etc.) of the document (e.g., a Web page) to a set of one or more ads may be generated. Such a "region-ad" table may be used to (i) map search results 1, 4 and 5 to ad set 1 1545*a*, (ii) map search results 2, 6, 7 and 9 to ad set 2 1545*b*, and (iii) map search results 3, 8 and 10 to ad set 3 1545*c*. Recall from FIG. 7 that an interest score may be computed for each ad. This information may be stored in an "ad-interest" table. These tables are transmitted to the client in conjunction with the search results Web page 1520. In one implementation, the tables are embedded within Javascript code which is part of the Web page 1520 being transmitted.

Figure 16:
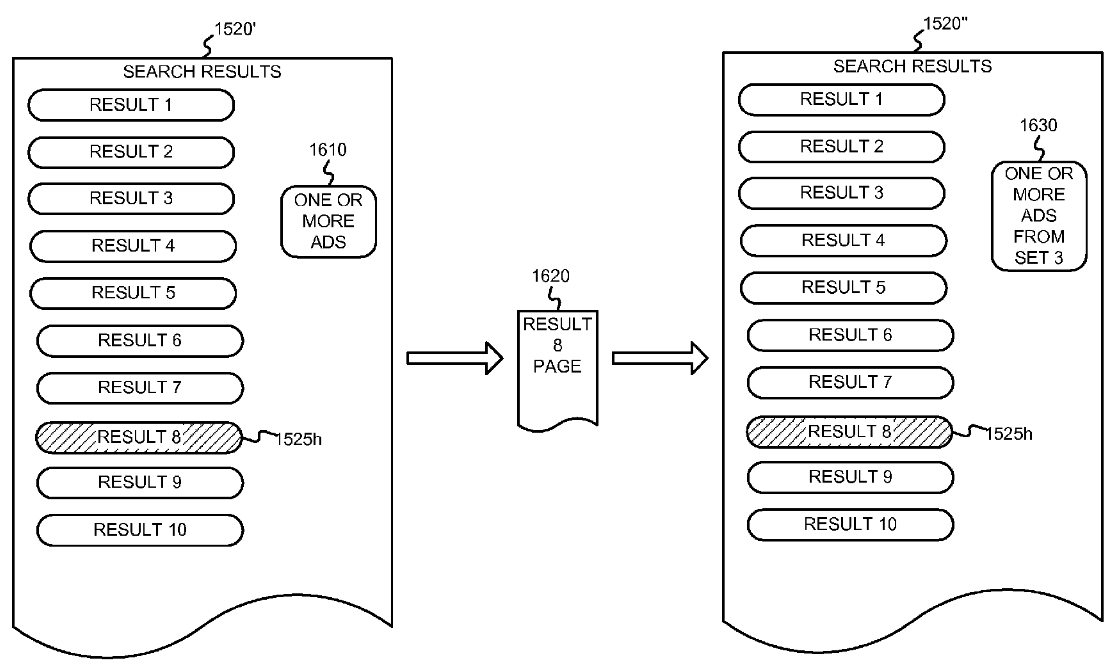

Referring to FIG. 16, when the optimized Web page 1520' is loaded into the client device, an initial ad or arrangement of ads 1610 is presented based on ad interest scores. Then, client device user activity is monitored and interest in regions that suggest a certain topic, and therefore a certain set of one or more ads, is recorded. In the example illustrated in FIG. 16, the user selects (e.g., clicks on) search result eight 1525*h* and is taken to that page 1620 by a browser for example. Since the eighth search result 1525*h* is associated with a Web page that has a topic concerning the NFL football team, 1540*c*, the interest scores of one or more ads of a third set are incremented. If the user then returns back to the search results Web page 1520", one or more ads 1630 from the third set 1630 have replaced the initial set of one or more ads 1610 (assuming that their incremented scores are greater than those of the ads originally presented).

Figure 17:
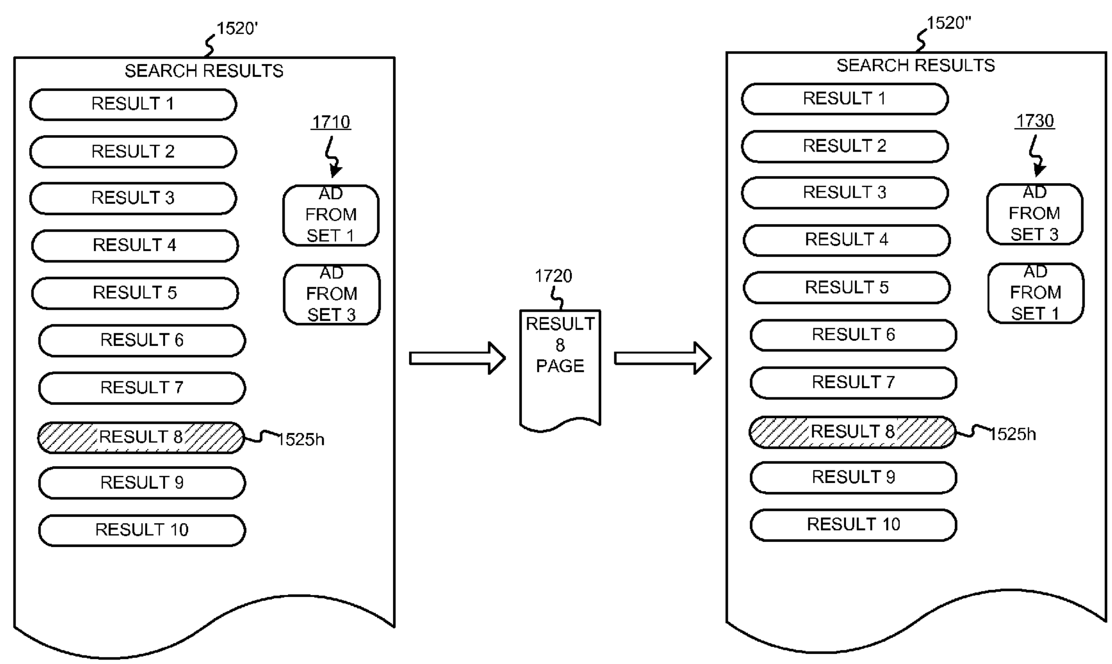

Naturally, a position ranking or some enhanced feature of the ads may be changed based on the updated ad interest scores. For example, as shown in FIG. 17, in the search results Web page 1520', initially, an ad from a first set associated with a first topic is displayed above an ad from a third set associated with the third topic as shown by 1710. After the ad interest scores of the one or more ads of the third set are increased because the user selected the link to the eighth page 1720, when the user returns to the search results Web page 1520", the ad form the third set associated with the third topic is displayed above the ad from the first set associated with the first topic as shown by 1730 (assuming that their incremented scores are greater than those of the ads originally presented).

In other implementations, the application of enhanced ad features may be determined using at least the ad interest score.

§4.4 CONCLUSIONS

As can be appreciated from the foregoing disclosure, the present invention can be used to resolve ambiguities with respect to a user topic interest so that useful topic-relevant ads may be presented to the user.

What is claimed is:

1. A computer-implemented method comprising:

a) providing, by a computer system having at least one computer in a network, responsive to a received search query, a document with a plurality of search results, wherein the search query has at least two different semantic interpretations corresponding to two different user information needs, the plurality of search results including
   i) a first search result associated with a first document having content concerning a first topic related to a first semantic interpretation of the search query, and
   ii) a second search result associated with a second document having content concerning a second topic related to a second semantic interpretation of the search query;

b) determining, by the computer system, which of the first and second semantic interpretations of the search query a user is most interested in based on behavior of the user with respect to one of the first and second search results;

c) selecting, by the computer system, one of a first set of one or more ads relevant to the first topic or a second set of one or more ads relevant to the second topic using, at least, the determination of user topic interest, wherein the first set of one or more ads is different from the second set of one or more ads; and d) serving, by the computer system, in association with the document, the selected one of the first or second set of one or more ads.

2. The computer-implemented method of claim 1 wherein if the user selects one of the first and second search results, then determining that the user is interested in a corresponding one of the first and second topics.

3. The computer-implemented method of claim 1 wherein the act of determining which of the first topic and the second topic a user is most interested in further includes monitoring at least one of (a) cursor positioning with respect to at least one of the first and second search results, (b) cursor dwell time with respect to at least one of the first and second search results, (c) user eye direction with respect to at least one of the first and second search results, (d) user facial expressions with respect to at least one of the first and second search results, (e) user expressions with respect to at least one of the first and second search results, or (f) express user topic interest input with respect to at least one of the first and second search results.

4. The computer-implemented method of claim 1 wherein the act of selecting one of a first set of one or more ads relevant to the first topic and a second set of one or more ads relevant to the second topic using, at least, the determination of user topic interest includes adjusting scores of one of a first set of one or more ads relevant to the first topic and a second set of one or more ads relevant to the second topic using, at least, the determination of user topic interest.

5. The computer-implemented method of claim 4 wherein the act of determining user topic interest includes monitoring behavior of the user with respect to the document.

6. The computer-implemented method of claim 4 wherein the act of determining which of the first topic and the second topic a user is most interested in further includes monitoring at least one of (a) cursor positioning with respect to at least one of the first and second search results, (b) cursor dwell time with respect to at least one of the first and second search results, (c) user eye direction with respect to at least one of the first and second search results, (d) user facial expressions with respect to at least one of the first and second search results, (e) user expressions with respect to at least one of the first and second search results, or (f) express user topic interest input with respect to at least one of the first and second search results.

7. A computer-implemented method comprising:

a) providing, by a computer system having at least one computer in a network, a first document, the first document including 1) content concerning a first topic, and 2) a link to a second document including content concerning a second topic;

b) serving, by the computer system, the first document in association with ads relevant to the first topic;

c) receiving, by the computer system, information indicating that a user selected the link; and d) responsive to the information and further information indicating that the user navigated back to the first document after having navigated to the second document, serving, by the computer system, the first document in association with ads relevant to the second topic, wherein the ads relevant to the first topic are different from the ads relevant to the second topic.

8. The computer-implemented method of claim 7 wherein the first document is a first Web page, the second document is a second Web page, and the link is a hypertext link.

9. The computer implemented method of claim 7, wherein the act of serving the first document in association with ads relevant to the second topic includes increasing a score of ads relevant to the second topic in response to the receipt of the information, and serving the ads relevant to the second topic based on their scores.

10. The computer implemented method of claim 7, wherein the act of serving the first document in association with ads relevant to the second topic includes scoring ads relevant to the second topic in response to the receipt of the information, and serving the ads relevant to the second topic based on their scores.

11. Apparatus comprising:

a) one or more processors;

b) at least one input device;

c) at least one output device; and d) one or more storage devices storing processor-executable instructions which, when executed by one or more processors, perform a method of 1) providing, responsive to a received search query, a document with a plurality of search results, wherein the search query has at least two different semantic interpretations corresponding to two different user information needs, the plurality of search results including i) a first search result associated with a first document having content concerning a first topic related to a first semantic interpretation of the search query, and ii) a second search result associated with a second document having content concerning a second topic related to a second semantic interpretation of the search query;

2) determining which of the first and second semantic interpretations of the search query a user is most Interested in;

3) selecting one of a first set of one or more ads relevant to the first topic and a second set of one or more ads relevant to the second topic using, at least, the determination of user topic interest, wherein the first set of one or more ads is different from the second set of one or more ads; and 4) serving, in association with the document, the selected one of the first and second set of one or more ads.

12. The apparatus of claim 11 wherein determining which of the first topic and the second topic a user is most interested in further includes monitoring at least one of (a) cursor positioning with respect to at least one of the first and second search results, (b) cursor dwell time with respect to at least one of the first and second search results, (c) user eye direction with respect to at least one of the first and second search results, (d) user facial expressions with respect to at least one of the first and second search results, (e) user expressions with respect to at least one of the first and second search results, or (f) express user topic interest input with respect to at least one of the first and second search results.

13. The apparatus of claim 11 wherein selecting one of a first set of one or more ads relevant to the first topic and a second set of one or more ads relevant to the second topic using, at least, the determination of user topic interest includes adjusting scores of one of a first set of one or more ads relevant to the first topic and a second set of one or more ads relevant to the second topic using, at least, the determination of user topic interest.

14. Apparatus comprising:

a) one or more processors;

b) at least one input device;

c) at least one output device; and d) one or more storage devices storing processor-executable instructions which, when executed by one or more processors, perform a method of 1) providing a first document, the first document including i) content concerning a first topic, and ii) a link to a second document including content concerning a second topic;

2) serving, the first document in association with ads relevant to the first topic;

3) receiving information indicating that a user selected the link; and 4) responsive to the information and further information indicating that the user navigated back to the first document after having navigated to the second document, serving, the first document in association with ads relevant to the second topic, wherein the ads relevant to the first topic are different from the ads relevant to the second topic.

15. The apparatus of claim 14 wherein the first document is a first Web page, the second document is a second Web page, and the link is a hypertext link.

16. The apparatus of claim 14, wherein the act of serving the first document in association with ads relevant to the second topic includes increasing a score of ads relevant to the second topic in response to the receipt of the information, and serving the ads relevant to the second topic based on their scores.

17. The apparatus of claim 14, wherein the act of serving the first document in association with ads relevant to the second topic includes scoring ads relevant to the second topic in response to the receipt of the information, and serving the ads relevant to the second topic based on their scores.

* * * * *